Aug. 9, 1966  D. H. LOCKART  3,264,918
APPARATUS FOR TESTING ELECTRICAL COMPONENTS
Filed Oct. 11, 1961  9 Sheets-Sheet 1

INVENTOR
D. H. LOCKART
By W. A. Johnson
ATTORNEY

Aug. 9, 1966  D. H. LOCKART  3,264,918
APPARATUS FOR TESTING ELECTRICAL COMPONENTS
Filed Oct. 11, 1961  9 Sheets-Sheet 5

INVENTOR
D. H. LOCKART
By
ATTORNEY

Aug. 9, 1966  D. H. LOCKART  3,264,918
APPARATUS FOR TESTING ELECTRICAL COMPONENTS
Filed Oct. 11, 1961  9 Sheets-Sheet 6
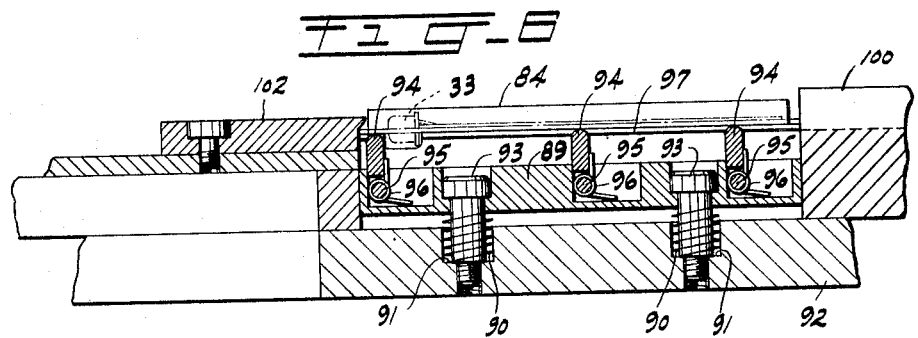
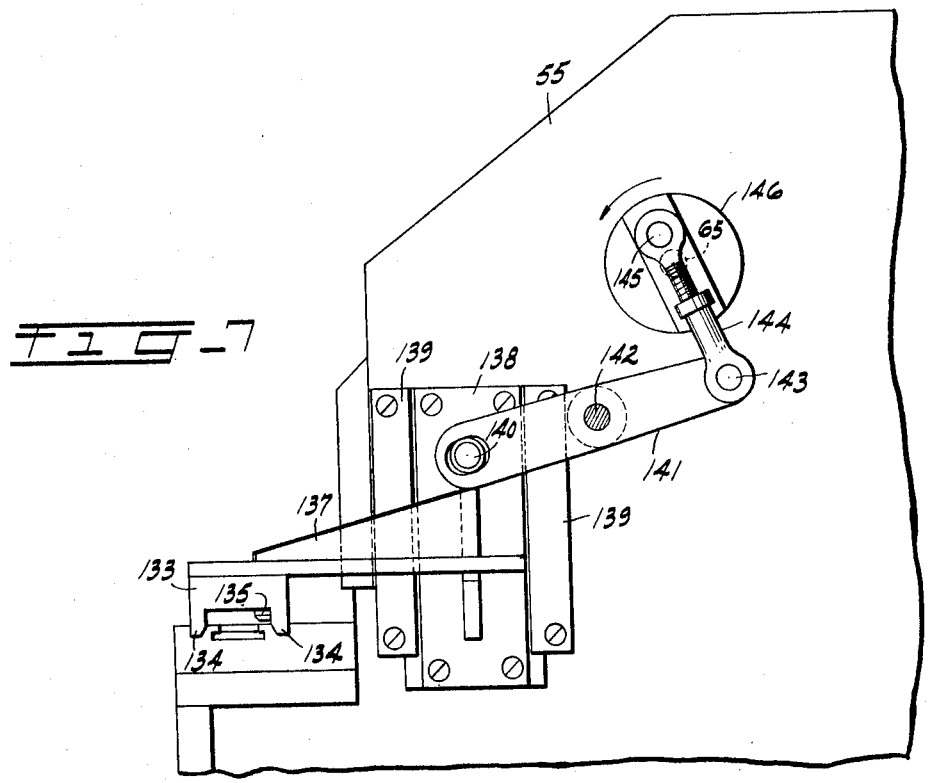
INVENTOR
D. H. LOCKART
BY
ATTORNEY

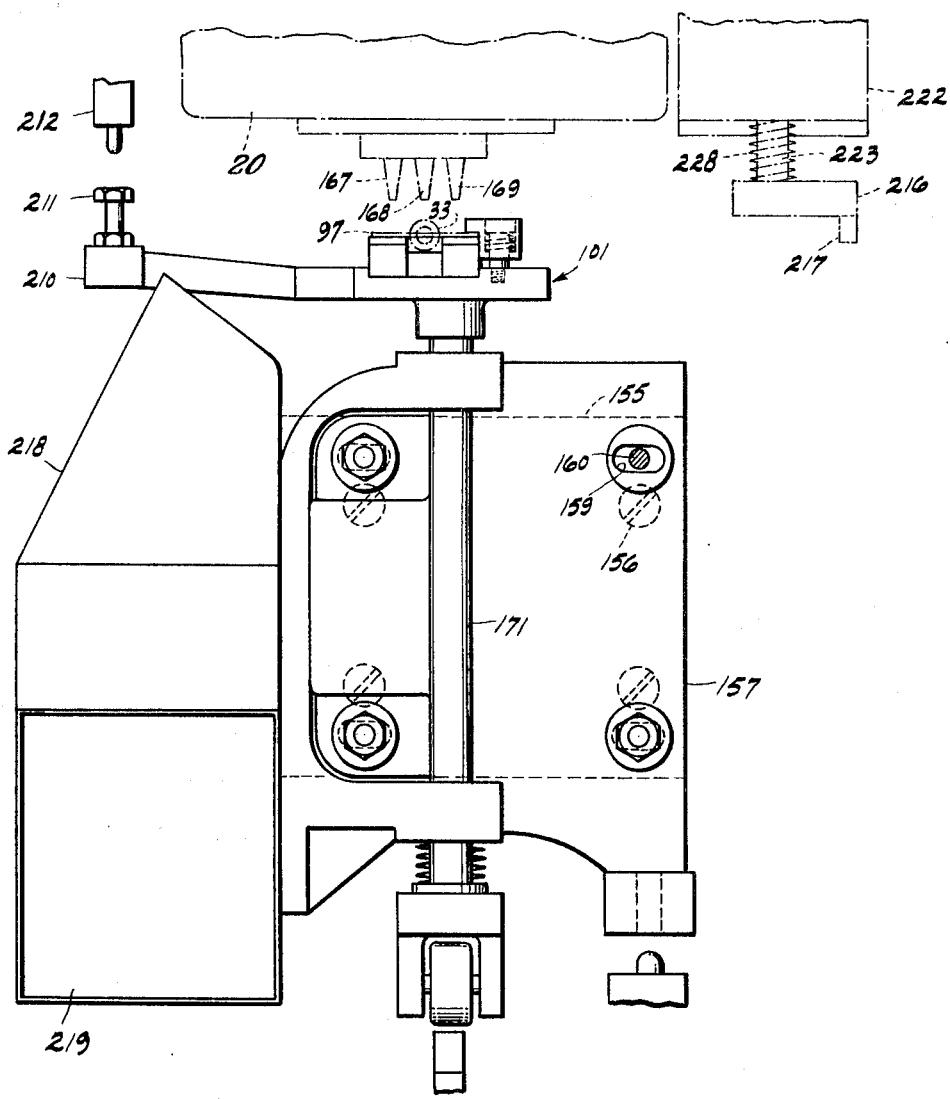

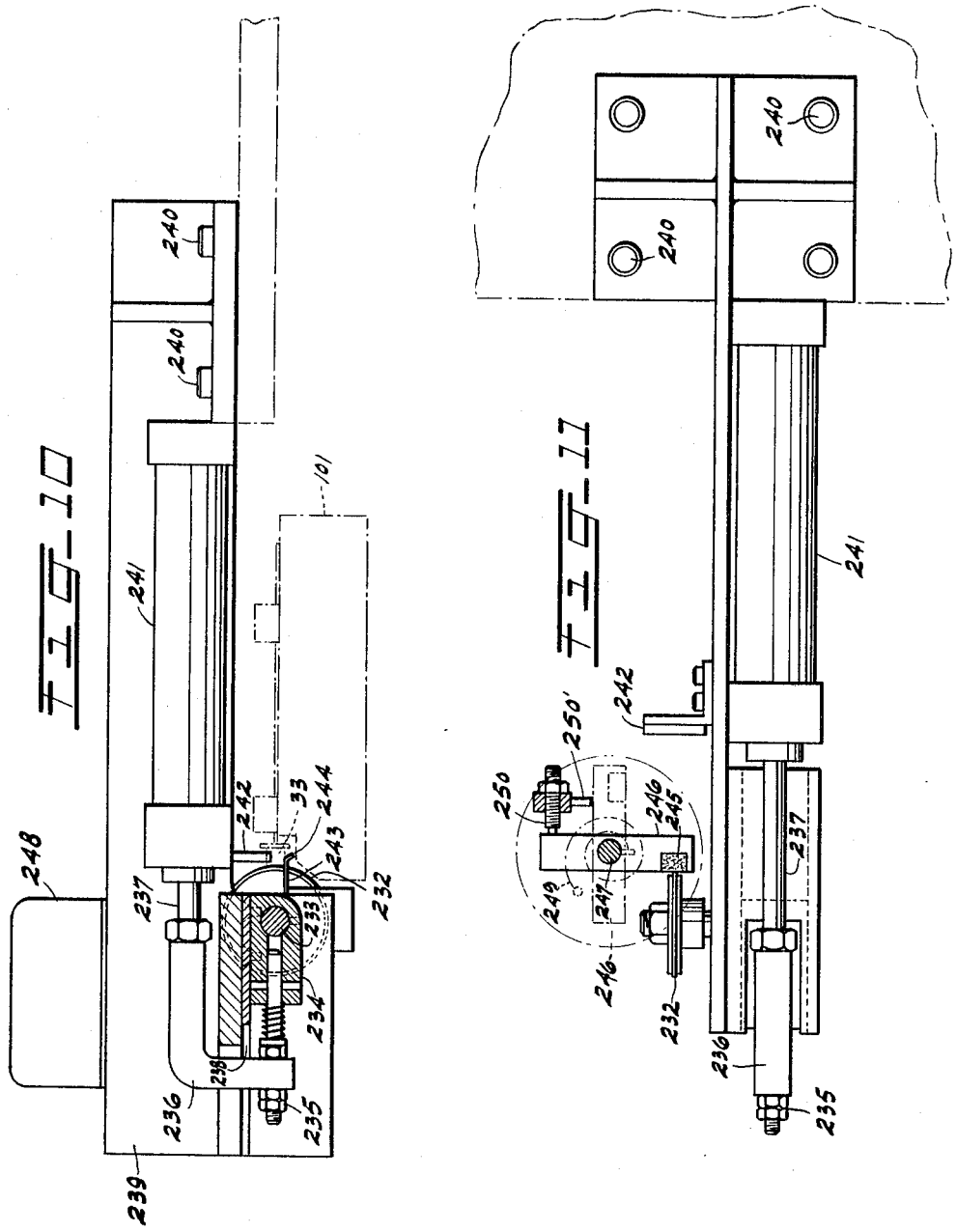

United States Patent Office 3,264,918
Patented August 9, 1966

3,264,918
APPARATUS FOR TESTING ELECTRICAL COMPONENTS
David H. Lockart, Womelsdorf, Pa., assignor to Western Electric Company, Incorporated, a corporation of New York
Filed Oct. 11, 1961, Ser. No. 144,366
18 Claims. (Cl. 83—160)

This invention relates to apparatus for testing electrical components, particularly components mounted in equally spaced positions and dielectric strips with their leads held in relatively spaced positions thereon.

After electrical components have been completed structurally, in most instances they must be subjected to one or more tests to determine their prospective effectiveness in actual use. In the case of components which are small in size and have leads extending from the ends thereof, it is difficult, if not impossible, to move the components manually through testing stations. Therefore, during testing operations, it is necessary for handling purposes to mount these types of components on a material which has sufficient rigidity to support the components and their leads. For example, in the assignee's co-pending application of H. F. Anspach, Serial No. 142,556, filed October 3, 1961, now Patent 3,177,629, components are mounted in equally spaced positions on a vulcanized fiber strip with the leads of each component held by tapes in predetermined spaced positions with respect to each other. In toto, 1500 equally spaced components are so mounted on a dielectric strip the strip being adapted to be wound on a take-up reel.

The object of the present invention is a highly efficient and practical apparatus for cutting the aforementioned strip into individual cards and moving the cards relative to a plurality of testing stations to successively test the components.

According to the object, the apparatus comprises means to cut the strip into equal size cards, each supporting an individual component with its spaced leads, feeding the cards to individual holders and moving the holders relative to test units where the components may be tested through their spaced leads.

More specifically, the apparatus includes an endless conveyor supporting holders at equally spaced positions. The conveyor is movable intermittently to advance the holders successively to a feeding station where the strip is cut into the individual cards for each component. Each card is then fed to a holder which has been advanced to the feeding station. This movement also advances the holders to move the components into successive test stations where their leads are coupled to test units.

Other objects and advantages will be apparent from the following detailed description when considered in conjunction with the accompanying drawings wherein:

FIGS. 1 and 2, when placed end to end, will illustrate a top plan view of the apparatus;

FIG. 6 is a fragmentary vertical sectional view of a portion of the feeding station in the area where the strip is cut;

FIG. 7 is a fragmentary front elevational view of a guide means for the cards and components at the feeding station;

FIG. 9 is a front elevational view of one of the holders at a test station;

FIG. 10 is a side elevational view of a date stamping unit of the apparatus; and FIG. 11 is a top plan view of the date stamping unit.

Figure 1:
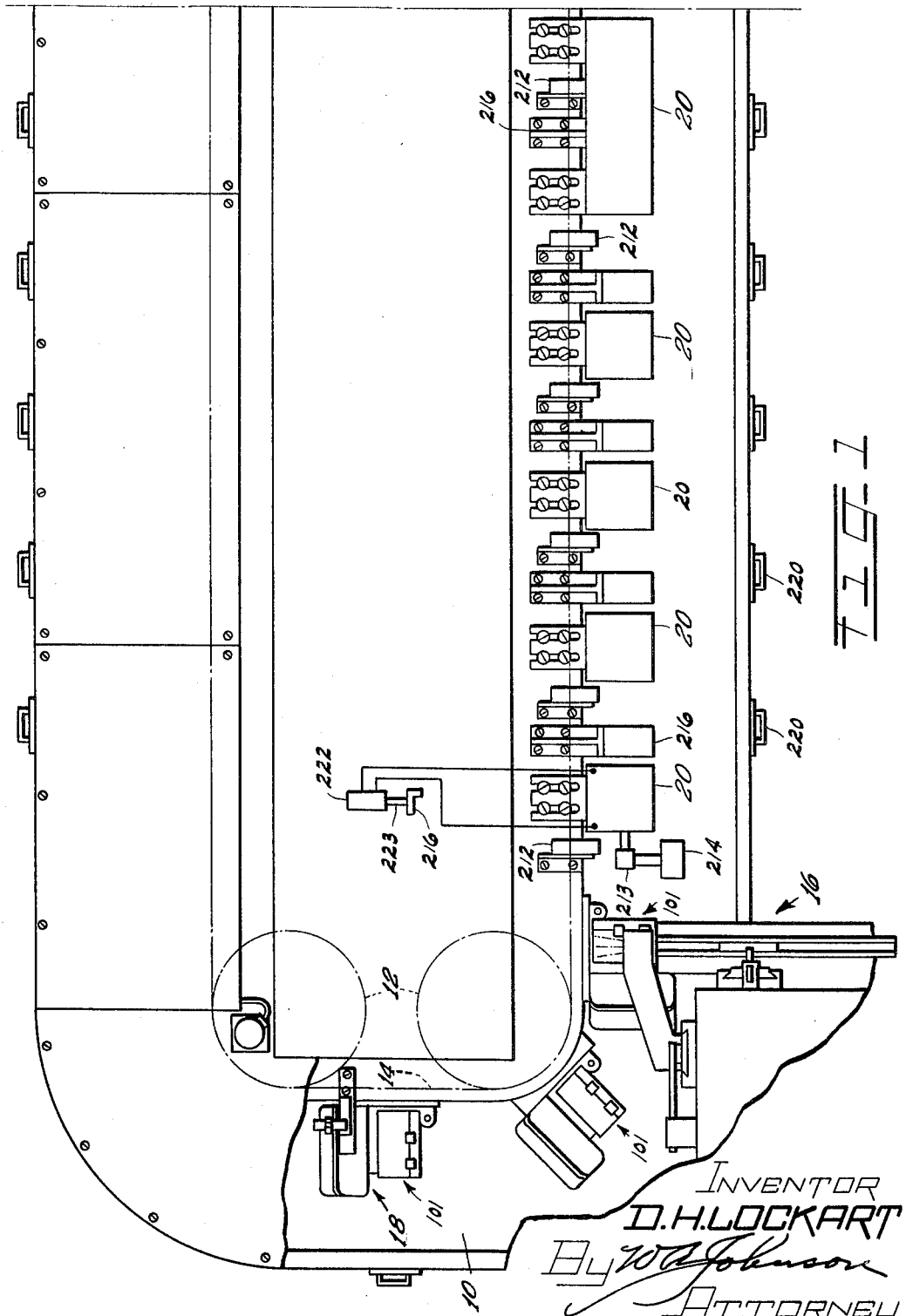
Figure 2:
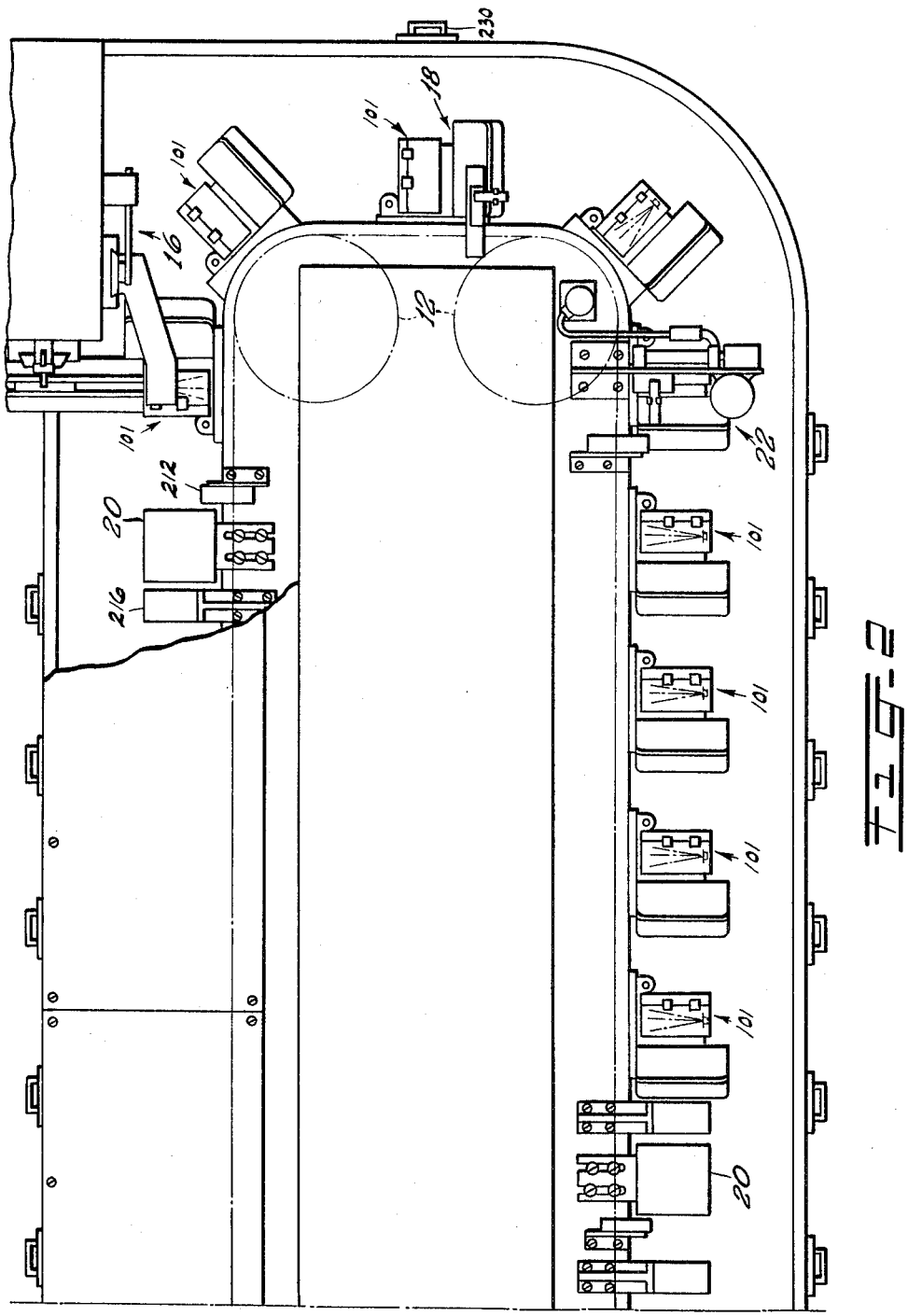
Figure 3:
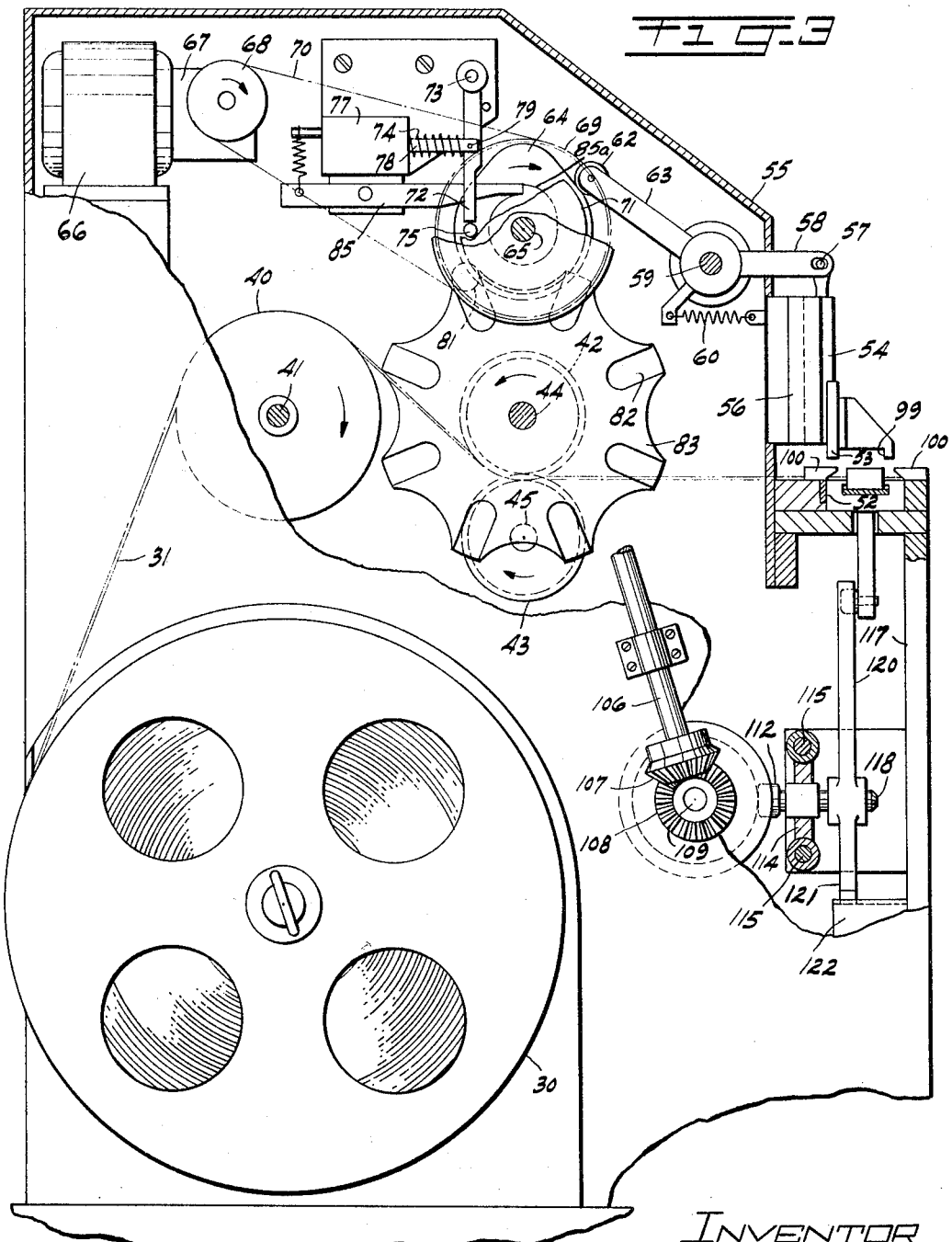
FIG. 3 is a vertical sectional view of the apparatus at the feeding station taken from the side thereof.

Upon viewing FIGS. 1 and 2 placed end to end, a preferred embodiment of an apparatus for testing electrical components in accordance with the objects of the invention comprises a housing 10 having four sprocket wheels 12 mounted thereon. A conveyor 14 of a commercially available type is mounted on the sprocket wheels and is operable to be driven therearound by drive means (not shown) which are operatively connected to one or more of the sprocket wheels. The conveyor is operable to receive a succession of card-like units, each supporting a component thereon, from two feeding units 16, one mounted on each side of the apparatus. An ejecting unit 18 is also mounted on each side of the apparatus. A plurality of similar but not necessarily identical electrical testing units 20 are mounted on housing 14 between the feeding unit and the ejecting unit on both sides of the apparatus, each testing unit being operable to perform one or more tests on components carried on the conveyor. A date stamping unit 22 is also included on each side of the apparatus. Since the elements on both sides of the apparatus are identical, two similar components operating cycles may be carried out simultaneously.

Due to this identity of elements on each side of the apparatus, further description will be directed to one side only, it being understood that it is descriptive of the other side of the apparatus as well.

Figure 4:
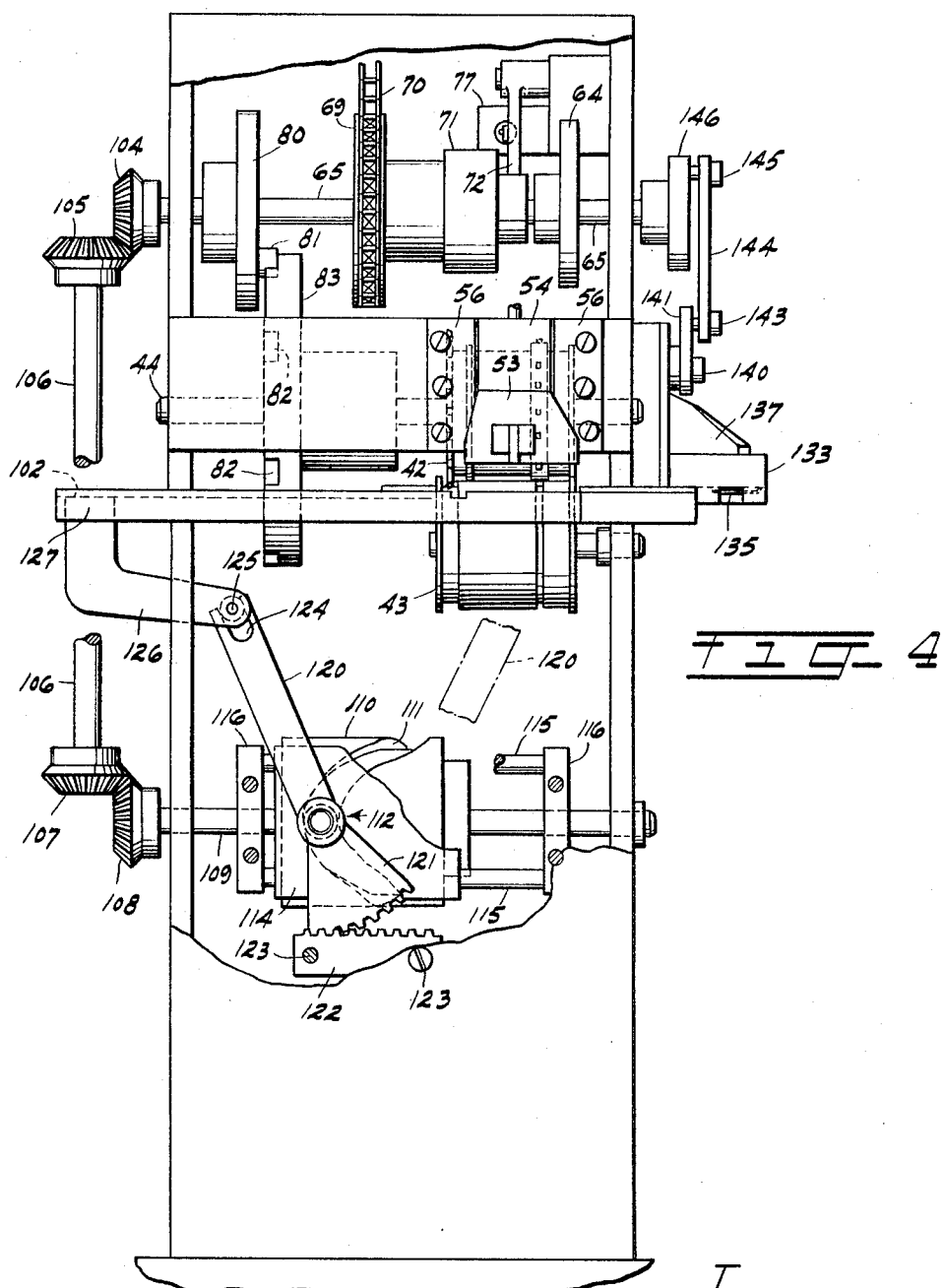
FIG. 4 is a vertical sectional view of the feeding station taken from the back thereof.
Figure 5:
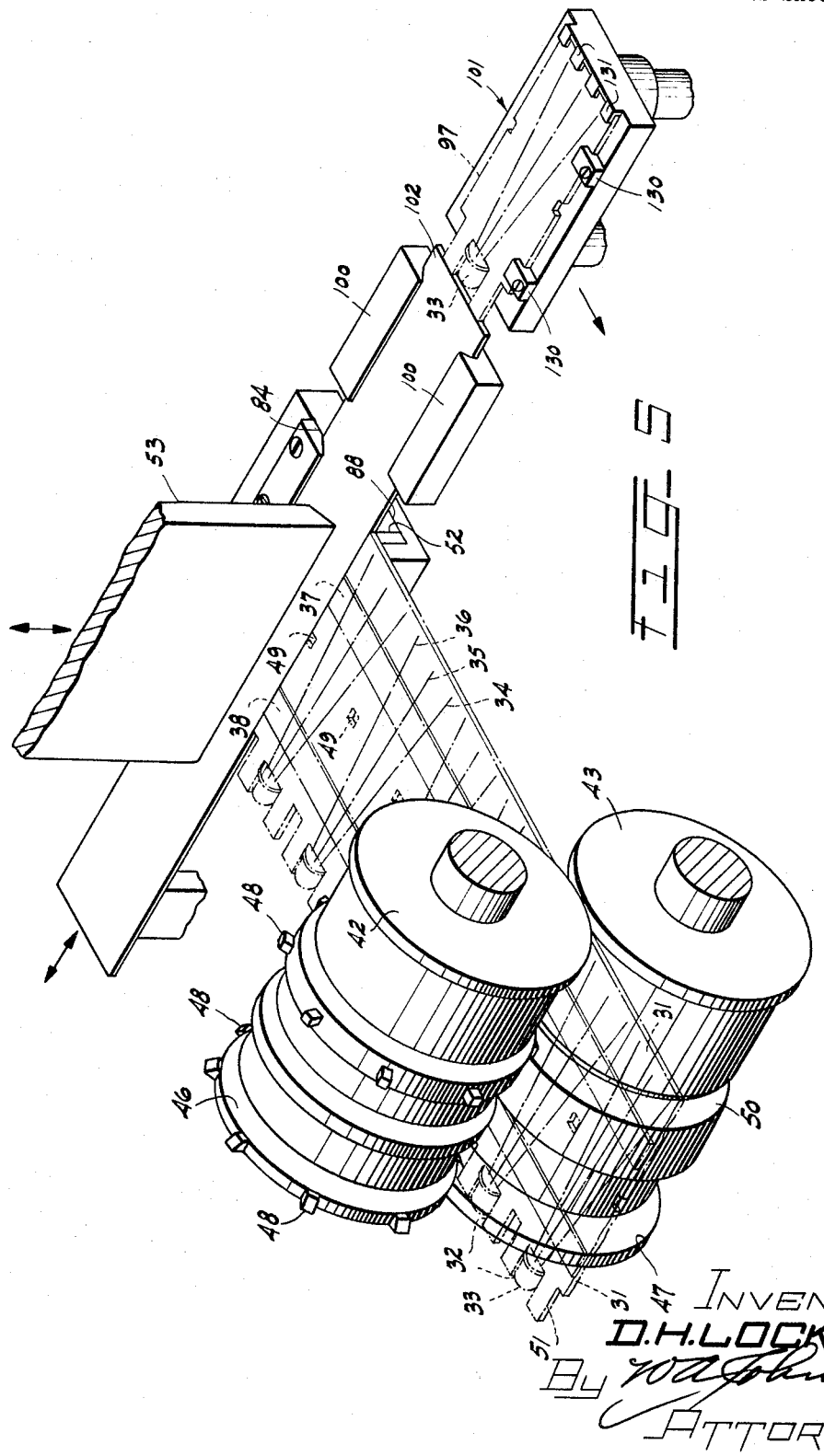
FIG. 5 is a schematic isometric view illustrating the operations at the feeding station.

Attention is now directed to the feeding unit shown in FIGS. 3 to 6, inclusive. The unit comprises a supply reel 30 operable to pay off a strip of dielectric material 31 such as vulcanized fiber. As best seen in FIG. 5, dielectric strip 31 is formed with a plurality of spaced apertures 32 along one edge thereof to receive a succession of components 33. In the embodiment herein described, the components have three leads, but the invention is adapted to handle components with any number of leads. Leads 34, 35, and 36 of each component are spaced equal distances apart and held in these positions by tapes 37 and 38 which are secured to the strip and closely engage the leads to hold them in their respective positions.

The strip 31 is threaded about a roller 40 mounted at 41 and between rollers 42 and 43 mounted respectively at 44 and 45. The rollers 42 and 43 have corresponding grooves 46 and 47 to provide clearance for the components 33. The roller 42 has two sets of spaced projections 48 adapted to enter spaced apertures 49 in the strip to serve as a positive driving connection between the roller 42 and the strip, the roller 43 being grooved circumferentially at 50 to avoid interference with the projections 48.

The leading end of the strip 31, prior to the feeding action or after each cutting operation, terminates adjacent a first, stationary cutter element 52. A second cutter element 53 is mounted on a slide 54 which is mounted for slidable motion in a housing 55 between a pair of guides 56. As seen best in FIG. 3, slide 54 is connected at 57 to one end of a lever 58, the other end of which is mounted on a shaft 59. The shaft and lever are urged in a counterclockwise direction by a spring 60, tending to urge the cutter 53 upwardly. A cam follower 62, is fixedly attached to shaft 59 at one end, and follows the contour of a cam 64 at its other end. Cam 64, which is supported on the drive shaft 65, is adapted to be driven by an electric motor 66 through a speed reduction means 67, the driving connection being made by sprockets 68 and 69, mounted on the cam and speed reduction means respectively, and chain 70 mounted thereover when a conventional one-revolution clutch 71 is released. The sprocket 69, FIG. 4, is fixed to a portion of the clutch 71.

The clutch 71 is held normally inactive by a stop 72 pivotally supported at 73 and urged by a spring 74 into position to have its end located in the path of a pin 75. The pin 75 is mounted at the side of the clutch member 71 and when freed, causes engagement of the clutch for one revolution of cam 64. The clutch is engaged by energizing a solenoid 77, causing its core 78, which is connected to the stop 72 at 79, to move the stop free of the pin 75. Spring 74 serves to locate the stop in the path of the pin at the end of one-revolution of the cam.

Referring particularly to FIG. 4, roller 42 is rotated a predetermined amount during each cycle of operation of drive shaft 65 by a drive means 80 which is the driving element of a Geneva unit. The Geneva unit also includes a pin 81 affixed to drive means 80 and adapted to enter a plurality of spaced notches 82 of a wheel 83 mounted on shaft 44. In operation, wheel 83 is rotated during the first quarter of the operating cycle of drive shaft 65 by pin 81 which engages the walls of a notch 82 and rotates the wheel a distance equal to the distance between two adjacent notches, there being a major portion of the operating cycle remaining for operation of the cutter 53. In other words, during the initial first quarter of its cycle, the Geneva drive causes advancement of the strip 31 a distance equaling the distances between the portions thereof supporting the individual components, moving the strip, for example in FIG. 5, from the cutting edge 52 of the stationary cutter to a stop 84. The possibility of a reverse rotation of shaft 65 after the operating cycle is eliminated by a spring-biased pall 85 (FIG. 3) and a one-tooth ratchet 85a mounted on shaft 65. During the remaining portion of the operating cycle, that portion between the completion of the movement of the wheel 83 and the final stopping of the shaft 65, the cam 64 causes movement of the cutter 53 through its complete cycle to cut the portion from the strip, forming a card which supports a single component.

The stationary cutter 52 (FIG. 5) is disposed at an edge of a recess 88 in which a pressure pad 89 (FIG. 6) is disposed. The pad 89 is supported by springs 90 mounted in recesses 91 of a support 92 and disposed concentric with retaining screws 93 disposed in apertures of the pressure pad. Vertically extending supporting elements 94 pivotally mounted at 95 are normally held in their vertical positions by springs 96 so that their rounded upper ends are adapted to support the portion of strip 31 advanced beyond cutting member 52 to stop 84 prior to each cutting operation. As the cutter 53 moves downwardly to cut a card 97 from the strip 31, an associate member 99 (FIG. 3) carried by the cutter, will engage the card adjacent the leading end thereof, moving it downwardly during the cutting operation and, in so doing, compress the springs 90 beneath the pressure pad 89 until the cutting operation has been completed. After the cutting operation, the springs 90 will return the pressure pad to its top position aligning the card 97 with guides 100 for movement toward holders 101 (FIG. 5) hereinafter described, which are moved successively into the feeding station.

The means to move the cards from the elements 94 onto their holders 101 includes a pusher 102 movable from the position shown in FIG. 6 adjacent the left end of the pressure pad 89 to the position shown schematically in FIG. 5, where the card 97 with its component 33 has been moved onto the holder 101 at the feeding station. The means for moving the pusher 102 originates with the main drive shaft 65 (FIG. 4) and continues through beveled gears 104 and 105 mounted on the shafts 65 and 106, respectively, and through beveled gears 107 and 108 mounted on shafts 106 and 109, respectively. The shaft 109 may be defined as a cam shaft in that a drum cam 110 is mounted thereon and provided with a groove 111 therein for receiving a cam follower 112. The cam follower 112 is mounted on a slide 114 supported by parallel rods 115, the ends of which are secured in stationary members 116 mounted on a vertical member 117 (FIG. 3) of the housing 55. The cam follower 112 is actually mounted on a spindle 118 supported by the slide 114.

An arm 120 is rotatably mounted on the spindle 118 and has a gear segment 121 (FIG. 4) fixed to the lower end thereof, the teeth of the gear segment interengaging teeth of a rack 122 which is fixedly mounted at 123. The upper end of the arm 120 is bifurcated at 124 to straddle a connection 125 with an arm 126 fixed at 127 to the pusher 102. Therefore, during each operating cycle of the shaft 65, after the card 97 has been cut from the strip 31 and the cutter 53 raised to allow the card 97 to return with the pressure pad 89 to its top position, the pusher 102 is moved to the right (FIG. 6) to move the card from the elements 94 onto the holder 101. During this action, it will be noted by viewing FIG. 6 that the elements 94 are in the path of the pusher 102 but may be moved by the pusher clockwise about their pivots 95 as the pusher is moved into engagement with each of the elements, these elements being returned to their normal positions by their springs 96 when the pusher 102 returns to its starting position shown in FIG. 6.

Each holder 101 has side retaining members 130 (FIG. 5) and end retaining members 131 to hold the cards against displacement. A guiding means is provided to assist the pusher and the guides 100 in locating the cards 97 accurately on their holders. This includes a main guide 133 (FIGS. 4 and 7) having side members 134 to engage sides of the card 97 and a spring 135 positioned to engage gently, but with sufficient pressure, the top of the card to hold it down as it is moved onto the holder 101 to assure guiding of the card beneath the members 130 and 131. The guide 133 cannot be in its guiding position during movement of the holders into and out of the feeding station and, for this reason, it is mounted on an arm 137 which is fixed to a slide 138 (FIG. 7) movable between guides 139 mounted on the housing 55.

The slide 138 is connected at 140 to one end of a lever 141 which is pivoted at 142, the other end of the lever being connected at 143 to an adjustable crank lever 144. The crank lever 144 is mounted at 145 on an eccentric 146 which is mounted on the shaft 65. Therefore, at a predetermined period of each operating cycle of the shaft 65, the guide 133 will be moved into position after each holder 101 has been located at the feeding station to guide the card 97 onto the holder and will be moved out of its guiding position to free the holder to move out of the feeding station.

Attention is now directed to FIGS. 1, 2, 8, and 9 and particularly the holders 101 and their associated structures which are spaced like distances apart along the conveyor 15. The detailed structure of the conveyor is not shown as it is a commercially known type of structure but, as an illustration in FIG. 8, the conveyor 14 is in the form of a chain 150 fixed at equally spaced positions at 151 to members 152 which are supported by suitable tracks or guides 153 and assisted by members 154 for movement with the chain 150 of the conveyor 15.

A guide block 155 is fixed at 156 to each member 152 and supports a bracket 157 which is grooved at 158 to receive the guide 155. The bracket 157 has elongated apertures 159 at spaced positions therein to receive studs 160, like ends of which are threadedly mounted in apertures 161 of the guide 155. Each stud 160 is provided with a spring 162 interposed between washers 163 and 164 and held partially compressed by a nut 165. In this manner, the four springs mounted on the four studs 160 serve to forcibly hold the bracket 157 on the guide 155 but permit lateral movement of the bracket for the purpose of aligning or positioning the leads 34, 35, and 36 of the component 33 in the testing position for engagement with probes or contacts 167, 168, and 169, respectively, of a test unit 20.

Each holder 101 is supported by parallel rods 171 at their upper ends, the lower ends of the rods being fixedly mounted in apertures of an actuator 173 having a cam follower 174. The actuator 173 is urged downwardly by a spring 175 to position the holder 101 on an adjustable stop 176 mounted on a bearing member 177 of the bracket 157 which has bearings 178 through which the rods 171 extend. Another bearing member 179 of the bracket 157 has similar bearing members 180 for the lower portions of the rods 171.

At each test station, and at any other station where it may be desired, a cam operating means is provided to operate an aligning element 183 and the actuator 173. These means on each side of the apparatus are responsive to a single drive, not shown, for rotating a cam shaft 184 extending longitudinally of each side of the apparatus and operated during the intervals of rest of the conveyor 15 through single cycles after the holders 101 are positioned at rest. This means, shown in FIG. 8, actually includes separate cams for the aligning element 183 and the actuator 173 but, as these cams are similar in structure, the one cam 185 with its low portion 186 and high portion 187 illustrates the actuation of the aligning element 183 in advance of the actuator 173. The element 183 is supported for vertical movement in an apertured guide portion 190 of a bracket 191, fixed at 192, and provided with a pin 193 movable in an elongated aperture 194 to hold the element against turning but to permit it to be moved upwardly in a guided path to enter an aperture 195 in each bracket 157 located at that station.

The rounded upper end of the element 183 will enter the aperture 195 whether it be aligned with the element or to one side or the other of a central alignment therewith, the purpose being to assure accurate positioning of the bracket 157 at each test station to cause accurate location of the holder to position accurately the leads of each component for engagement with the contacts of each test unit.

The element 183 has a cam follower 197 mounted on its lower end and is urged downwardly by a spring 198 to remain normally in its lower position for engagement with a cam lever 199. The cam lever 199 is of the contour shown in FIG. 8 having one end pivotally mounted at 200 on a bracket 201 and carrying a roller 202 for engagement with the cam 185. Furthermore, a cam lever 203 pivotally mounted at 204 on a bracket 205 has a curved surface 206 positioned to engage the roller 174 of the actuator 173 when moved about its pivot 204 by a roller 207 mounted thereon and positioned to engage the cam 185.

In the present instance, it will be apparent that during each cycle of operation of the cam 185, the high portion 187 will engage the roller 202 and cause the lever 199 to move the aligning element 183 into position to cause adjustment of the bracket 157 prior to the roller 207 engaging the high portion of the cam to move the actuator 173 with the rods 171 to move the holder 101 upwardly.

Each holder 101 has an arm 210 with an adjustable member 211 positioned to engage and actuate a switch 212 into open position. There are switches 212 for the test units 18 to 23, inclusive, connected in series in the circuit for driving the conveyor 15 to serve in holding the conveyor drive inactive should any one or more of the holders fail to move downwardly with the rollers 207 moving onto the low portions of their cams. As the leads of the components at the test stations are moved into engagement with the contacts of the test units, cams (not shown) on the cam shafts 184 operate switches to activate the test units to carry out the different tests on the components in their particular stations. As an example, in FIG. 1, a cam operable switch 213 for the unit 18 is shown connecting the test unit 18 with a source of electrical energy 214 when the switch 213 is closed.

Each test unit is provided with an ejector 216 which has two fingers 217 positioned in the path of the card 97 and, if allowed to remain in that position, the card would be moved free of its holder 101 and caused to drop down a chute 218 which is mounted on the bracket 157, the exit end 219 of the chute directing the rejected component and its card into a drawer 220. There are drawers 220 positioned about the apparatus for receiving components on their cards from any of the present test stations or from any additional test units which may be added to the apparatus. However, as illustrated schematically in FIG. 1 with regard to a test unit 20, the ejector 216 is responsive to the component being tested or, in other words, the test unit 20 includes circuits one of which will be closed to energize a solenoid 222 to actuate its core 223 to cause upward movement of the ejector 216, mounted thereon, out of the path of the card supporting the component which has passed the test of the unit 20. A spring 228 disposed concentric with the core 223 urges the ejector 216 normally into its down position.

All the components which pass the various tests when reaching the unit 22 (FIG. 2) shown in detail in FIGS. 10 and 11, are date stamped and continue on to station 18 where they are ejected with their cards 97 and allowed to drop into a drawer 230. The date stamping means includes a printing or indicia carrying wheel 232 of the type adapted to receive conventional date indicia on the periphery thereof. The wheel 232 is adjustably supported on a spindle 233 of a slide 234 which is adjustably secured at 235 to an arm 236 mounted on the outer end of a piston rod 237. The slide 234 is supported in a guideway 238 of a bracket 239 mounted at 240. The piston rod 237 is connected to a piston, not shown, mounted in an air cylinder 241, the cylinder being mounted on the bracket 239.

Figure 8:
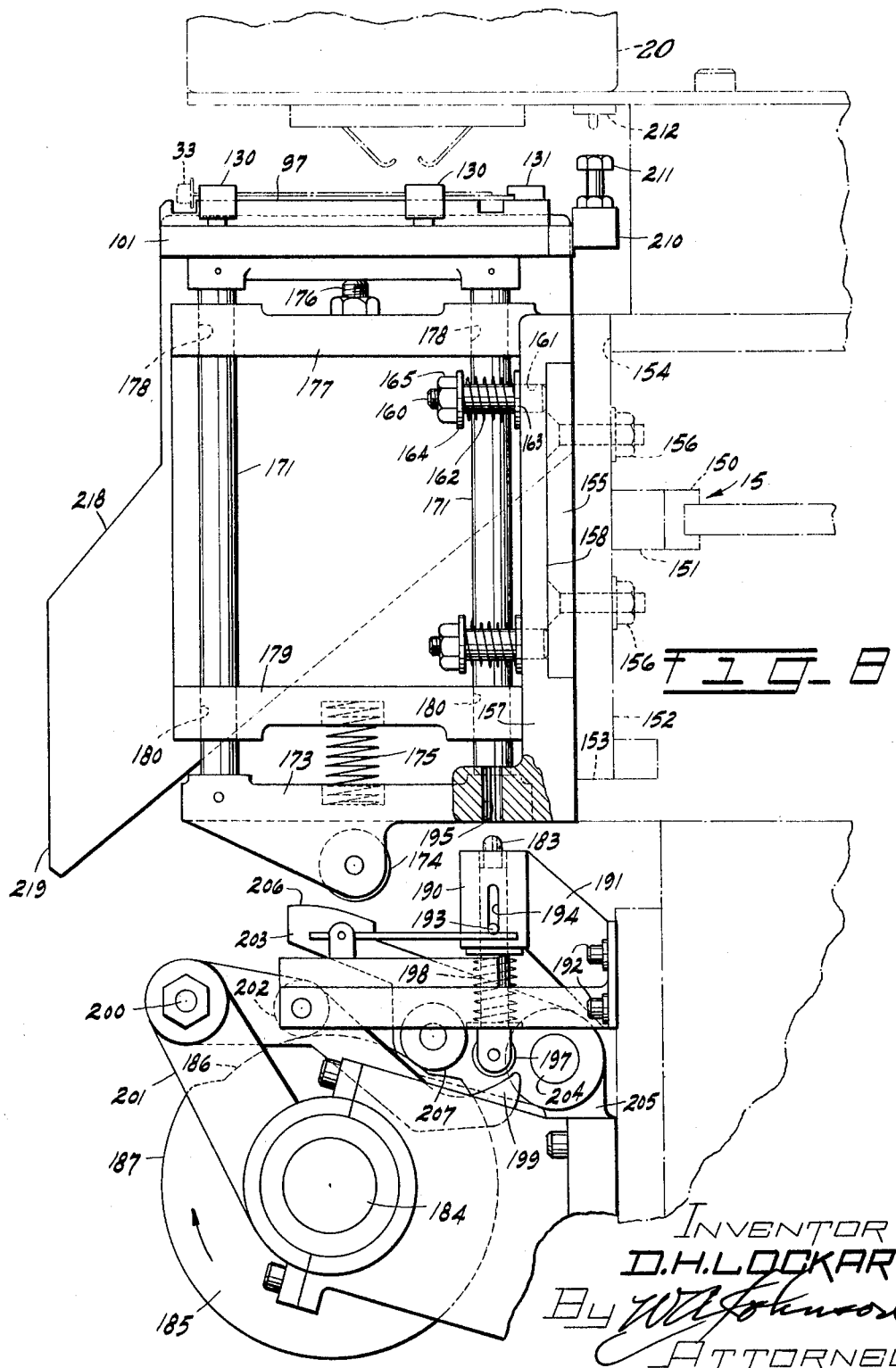
FIG. 8 is a side elevational view of one of the holders at a test station.

A cushion member 242, supported by the bracket 239, is positioned to be engaged by the upper portion of component 33 when moved upwardly through the cam operating means, illustrated in FIG. 8, to move the holder into the top position. Resilient fingers 243, supported by the slide 234 and having rounded ends 244, are positioned to engage under-portions of the component 33 and with the assistance of the cushion member 242, hold the component at a fixed position while the wheel 232 is moved into engagement with the end of the component through the actuation of the air cylinder 241 to stamp a date on the component.

Means is provided to supply the date wheel 232 with a suitable amount of coloring material or ink which is held normally in a pad 245 in a recess of an arm 246. The arm 246 is supported by a shaft 247 of a rotatable solenoid 248, the shaft 247 serving as a core for the solenoid and held normally by a spiral spring 249 against a stop 250'. However, when the solenoid 248 is energized, which is in advance of each stamping operation, the arm 246 is rotated from the broken line position in FIG. 11 to the solid line position where the pad 245 will engage the periphery of the date wheel 232 with a pressure controlled by an adjustable stop 250. In this manner, the date wheel is provided with suitable material such as ink in advance of each stamping operation.

*Operation*

With the present arrangement of a single conveyor and a multiplicity of holders 101 movable through repeated cycles of the conveyor between intervals of rest at two feeding stations and relative to varied numbers of test stations prior to reaching their separate final or ejecting stations 25, it is possible, through each side of the apparatus, to double the output of testing like components or, if desired, different components may be tested on different sides of the apparatus by using the same holders and producing cards of similar sizes from strips on which components of different types may be mounted.

The strips are advanced intermittently in their feeding stations where, in each instance, with a single drive 66 operating through a one-revolution clutch 71 to move the drive shaft 65 through single cycles, various operations are performed including the advancement of the strip the desired distance in each cycle to permit the cutting of a width therefrom, to produce identical cards with their components mounted thereon, to be fed through another means, operated by the shaft 65, to feed the cards to the successive holders moved into the feeding station. An additional means is operated by the main shaft 65 including the guide unit 133 (FIG. 7) positioned normally out of the path of the holders as they are moved between stations but lowered to guide the cards 97 onto their holders and beneath the members 130 and 131.

Furthermore, each side of the apparatus is provided with a single cam shaft 184 to operate means at each test station first, to position the bracket 157 supporting each holder 101, and then moving the holder upwardly to electrically connect the leads of the component in the test set at each testing station. As illustrated in FIGS. 1 and 2, the switches 212, the ejector 216, and the various selected test units 18 to 23, inclusive, are removably mounted above the paths of the holders 101. Furthermore, there are spaces between the test unit and the station 24 where the stamping unit is mounted to add other test units, if other tests are to be performed on the components or other components requiring additional tests are to be processed in the apparatus.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for testing electrical components mounted on successively integral card-like portions of dielectric strips with leads of the components held in relative spaced positions on their respective portions of the strips comprising:
   a single endless conveyor movable intermittently like distances between intervals of rest,
   like holders for the individual card-like portions mounted at spaced positions on the conveyor with vertical centers disposed said like distances apart,
   separate means disposed at spaced feeding stations mounted adjacent the conveyor to cut the strips into card-like portions with the components and their spaced leads held individually thereon,
   test units mounted at test stations extending from each feeding station and positioned said like distances apart, and
   means disposed at the test stations to move the holders to cause electrical connection of the leads of the components thereon with the test units.

2. An apparatus for testing electrical components according to claim 1 in which:
   ejectors are mounted relative to the path of the holders to cause removal of the card-like portions from holders traveling away from one feeding station and relative to its test units before reaching the next feeding station.

3. An apparatus for testing electrical components mounted on successively integral card-like portions of a dielectric strip with leads of the components held in relative spaced positions on their respective portions of the strip comprising:
   a feeding station,
   means disposed at the feeding station to cut the strip into card-like portions with the individual components and their spaced leads held thereon,
   a conveyor movable intermittently like distances between intervals of rest relative to the feeding station,
   like holders mounted at spaced positions on the conveyor with centers thereof disposed said like distances apart,
   test units mounted at test stations spaced from the feeding station and located relative to certain of the holders during their intervals of rest,
   means operable at the feeding station to successively move the card-like portions and their components onto the holders, and
   means operable simultaneously at the test stations to move the holders at those stations to electrically connect their components to the test units.

4. An apparatus for testing electrical components according to claim 3 in which:
   ejectors are movably mounted adjacent the test units and normally adapted to remain in the path of the card-like portions to remove the card-like portions from the holders leaving the test stations,
   means responsive to each component passing the test at each test station to move its ejector free of the path of the card-like portions,
   a stamping unit mounted at a stamping station beyond the test stations, and
   means to operate the stamping unit to stamp indicia on all components passing all the tests.

5. An apparatus for testing electrical components according to claim 3 in which:
   ejectors are movably mounted adjacent the test units and normally adapted to remtain in the path of the card-like portions to remove the card-like portions from the holders leaving the test stations,
   means responsive to each component passing the test at each test station to move its ejector free of the path of the card-like portions,
   a stamping unit mounted at a stamping station beyond the test stations,
   means to operate the stamping unit to stamp indicia on all components passing all the tests,
   the stamping unit including a printing wheel, and
   means supporting the wheel the operable to move it into and out of printing position.

6. An apparatus for testing electrical components according to claim 3 in which:
   ejectors are movably mounted adjacent the test units and normally adapted to remain in the path of the card-like portions to remove the card-like portions from the holders leaving the test stations,
   means responsive to each component passing the test at each test station to move its ejector free of the path of the card-like portions,
   a stamping unit mounted at a stamping station beyond the test stations,
   means to operate the stamping unit to stamp indicia on all components passing all the tests,
   the stamping unit including a printing wheel,
   means supporting the wheel and operable to move it into and out of printing positions,
   a stamping material applicator movably mounted adjacent the wheel and held normally away from the wheel, and
   a solenoid energizable to move the applicator into engagement with the printing wheel.

7. An apparatus for testing electrical components mounted on successive, integral card-like portions of a dielectric strip with the leads of the components held in relative spaced positions on their respective portions of the strip comprising:
   a feeding station,
   a test station mounted adjacent to the feeding station,
   means mounted at the feeding station operable to cut the card-like portions from the dielectric strip with the individual components and their spaced leads held thereon,
   holders for the individual card-like portions,
   means to move the holders in a given path relative to the stations to locate the holders successively at said stations,
   means connected to the feeding means operable to transfer the card-like portions therefrom onto the holders,
   a test unit having contacts extending therefrom mounted at the test station to test the successive components on their card-like portions, and means to move the holders successively away from said given path into the test station to cause the leads of the components to engage the contacts of the test unit.

8. Apparatus for testing electrical components according to claim 7, further comprising:

an aligning means operable in advance of the holder moving means to pre-position the holder so as to align the component leads with the test unit contacts.

9. An apparatus for testing electrical components according to claim 7, further comprising:

a supply circuit for the test unit, said supply circuit including a normally open switch mounted relative to the test unit, and a member carried by the holder and movable therewith away from said given path to close the normally open switch.

10. An apparatus for testing electrical components mounted on successive, integral card-like portions of a dielectric strip with leads of the components held in relative spaced positions on their respective portions of the strip comprising:

a feeding station including feed rollers for the strip, means mounted at the feeding station for guiding the strip to the feed rollers, means mounted at the feeding station operable to cut the card-like portions from the dielectric strip with the individual components and their spaced leads held thereon, a stop mounted at a fixed position beyond the cutting means to locate the successive card-like portion to be severed from the strip by the cutting means, means operated intermittently to cause the rollers to advance the leading card-like portion of the strip to the stop, the cutting means including a reciprocable blade-like cutter actuated after each advancement of the strip to sever the successive card-like portions with their components from the strip, a pressure pad supporting the leading card-like portions and movable by the cutter during each cutting operation, a plurality of holders for the individual card-like portions operable to be positioned successively adjacent the feeding station, means operable to move the card-like portions onto the holders, a test station mounted adjacent the feeding station, and a test unit mounted at the test station to test the successive components on their card-like portions.

11. An apparatus for testing electrical components according to claim 10, further including:

an associate member supported by and movable with the cutter to engage each leading card-like portion of the strip and cause uniform movement of each card-like portion on the pressure pad when cut from the strip.

12. An apparatus for testing electrical components according to claim 10, wherein the means operable to move the card-like portions into the holders includes:

a pusher, and means operable to activate the pusher subsequent to each cutting operation to push the card-like portions with their components off the pressure pad and onto a holder.

13. An apparatus for testing electrical components according to claim 10, wherein the means operable to move the card-like portions onto the holders includes:

a pusher, means operable to activate the pusher subsequent to each cutting operation to push the card-like portions with their components off the pressure pad and onto a holder, and a plurality of pivotal card-like portion supporting elements mounted beneath the pressure pad and spring biased into a vertical pressure pad supporting position, the supporting elements being movable out of said vertical position by the pusher when it moves the card-like portions successively to the holders.

14. An apparatus for testing electrical components according to claim 10, wherein the means operable to move the card-like portions onto the holders includes:

a pusher, means operable to activate the pusher subsequent to each cutting operation to push the card-like portions with their components off the pressure pad and onto a holder, a movable guide normally positioned out of the path of the holders when they are moved into the feeding station, and means to move the guide adjacent the successive holders when at the feeding station to assist the pusher in locating the card-like portions with their components on the holders.

15. An apparatus for testing electrical components according to claim 10, wherein the means operable to move the card-like portions onto the holders includes:

a pusher, means operable to activate the pusher subsequent to each cutting operation to push the card-like portions with their components off the pressure pad and onto a holder, retaining members mounted on the holders and having overextending portions beneath which part of the card-like portions are to be located to removably retain the card-like portions and their components on the holders, a guide normally positioned free of the holders when the holders are moved relative to the stations, and means to move the guide adjacent each holder at the feeding station and cause it to assist the pusher in locating the card-like portions under the overextending portions of the retaining members on the holders at the feeding station.

16. An apparatus for testing electrical components according to claim 10, wherein:

the means operable to move the card-like portions onto the holders includes:

a pusher, means operable to active the pusher subsequent to each cutting operation to push the card-like portions with their components off the pressure pad and onto a holder, retaining members mounted on the holders and having overextending portions beneath which part of the card-like portions are to be located to removably retain the card-like portions and their components on the holders, a guide normally positioned free to the holders when the holders are moved relative to the station, and means to move the guide adjacent each holder at the feeding station and cause it to assist the pusher in locating the card-like portions under the overextending portions of the retaining members on the holders at the feeding station, and the cutting means further includes:

a stationary cutter disposed at a position spaced from the stop and cooperable with the reciprocable blade-like cutter to effect the severance of the successive card-like portions from the strip, and means operated by the drive shaft to reciprocate the cutter.

17. An apparatus for testing electrical components according to claim 10 wherein:

the means operable to move the card-like portions onto the holders includes:
- a pusher, and
- means operable to activate the pusher subsequent to each cutting operation to push the card-like portions with their components off the pressure pad and onto a holder, and the cutting means further includes:
- a stationary cutter disposed at a position spaced from the stop and cooperable with the reciprocable blade-like cutter to effect the severance of the successive card-like portions from the strip, and
- means operated by the drive shaft operable to reciprocate the cutter.

18. An apparatus for testing electrical components according to claim 10 wherein:

the means operable to move the card-like portions onto the holders includes:
- a pusher for the feeding station, and
- means operable to activate the pusher subsequent to each cutting operation to push the card-like portions with their components off the pressure pad and onto a holder,
- a guide supported for movement relative to the holder in the feeding station and adapted to be positioned to guide the card-like portions and their components onto the successive holders at the feeding station, and
- means operable by the drive shaft to move the guide into and out of association with the holders at the feeding station, and the cutting means further includes:
- a stationary cutter disposed at a position spaced from the stop and cooperable with the reciprocable blade-like cutter to effect the severance of the successive card-like portions from the strip, and
- means operated by the drive shaft to reciprocate the cutter.

References Cited by the Examiner
UNITED STATES PATENTS

| | | | |
|---|---|---|---|
| 2,077,439 | 4/1937 | Schmitt | 83—925 |
| 2,787,355 | 4/1957 | Dodge | 192—33 |
| 2,881,911 | 4/1959 | Krill. | |
| 2,997,294 | 8/1961 | Gitzendanner | 209—81 X |
| 3,009,109 | 11/1961 | Jankowski. | |

M. HENSON WOOD, JR., *Primary Examiner.*

WALTER L. CARLSON, *Examiner.*

G. S. KINDNESS, J. N. ERLICH, *Assistant Examiners.*

UNITED STATES PATENT OFFICE
CERTIFICATE OF CORRECTION

Patent No. 3,264,918　　　　　　　　　　　　　　　　August 9, 1966

David H. Lockart

It is hereby certified that error appears in the above numbered patent requiring correction and that the said Letters Patent should read as corrected below.

Column 2, line 24, for "components" read -- complete --; column 8, line 23, for "remtain" read -- remain --; line 34, for "the wheel the" read -- the wheel and --; column 9, line 62, for "into" read -- onto --; column 10, line 57, for "to" read -- of --.

Signed and sealed this 5th day of September 1967.

(SEAL)
Attest:

ERNEST W. SWIDER　　　　　　　　　　　　　　EDWARD J. BRENNER
Attesting Officer　　　　　　　　　　　　　　　　Commissioner of Patents